United States Patent [19]
Kato et al.

[11] Patent Number: 6,164,543
[45] Date of Patent: Dec. 26, 2000

[54] METHOD OF DECIPHERING BAR CODES

[75] Inventors: Rick Allan Kato, Greeley; Kelly John Reasoner, Fort Collins, both of Colo.

[73] Assignee: Hewlett-Packard Company, Palo Alto, Calif.

[21] Appl. No.: 09/290,428

[22] Filed: Apr. 13, 1999

[51] Int. Cl.$^7$ ...................................................... G06K 7/10
[52] U.S. Cl. ................................ 235/462.25; 235/462.01
[58] Field of Search ........................... 235/462.25, 462.01

[56] References Cited

U.S. PATENT DOCUMENTS 6,032,865 3/2000 Itoh et al. ........................... 235/462.25

*Primary Examiner*—Harold I. Pitts

[57] ABSTRACT

A method of deciphering bar codes is disclosed herein. The method determines if the bar code complies with predetermined specifications. The method then sorts the bar code information into character groups. Each character group is reviewed individually to assure compliance with the predetermined specification. The individual character groups are then decoded individually. The method allows for bar code specification to have varying tolerances between the individual character groups, which increases the likelihood of a bar code reader being able to decipher the bar code.

10 Claims, 5 Drawing Sheets

METHOD OF DECIPHERING BAR CODES

TECHNICAL FIELD OF THE INVENTION

The present invention relates generally to deciphering inform/ion encoded in bar codes and, more particularly, to determining if data representing a bar code is in a predetermined bar code format.

BACKGROUND OF THE INVENTION

Bar codes are used in numerous applications to identify objects to which the bar codes are affixed. Examples of bar codes include the uniform price code used to identify retail goods and various forms of shipping labels used to track parcels. A bar code is an optical symbol containing coded information, in which the symbol is able to be imaged by an imaging device. The imaging device generates an image of the bar code and converts the image to machine-readable image data, referred to herein simply as "image data." The image data is output to a processor, which deciphers the image data representing the bar code to "read" the bar code. Reading the bar code is the operation of deciphering the bar code to obtain the information encoded in the bar code. The information encoded in the bar code may, as an example, identify the object to which the bar code is affixed.

A bar code may, as an example, be a representation of a character set, e.g. ASCII characters represented by binary numbers. One type of bar code format that represents a binary number consists of an array of alternating reflective and nonreflective surfaces in which the transition from one surface to an adjacent surface represents the transition from one bit to another bit of a binary number. The alternating reflective and nonreflective surfaces may, for example, be alternating reflective and nonreflective stripes. The reflective stripes are sometimes referred to herein as "spaces" and the nonreflective stripes are sometimes referred to herein as "bars." The bars may, as an example, be dark-colored stripes and the spaces may as an example, be light-colored stripes. Each stripe, thus, represents one bit of the binary number. The stripes may, as an example, be either wide or narrow. A wide stripe may represent a one and a narrow stripe may represent a zero. The binary number represented by the bar code is, thus, defined by the widths of the alternating bars and spaces.

One type of bar code format is known in the art as Code 39 or Code 3 of 9. Code 39 consists of an array of stripes, which consist of alternating bars and spaces. The bars and spaces are either wide or narrow. A character per the Code 39 format consists of ten stripes wherein the first stripe is a leading narrow space, leaving nine remaining stripes to comprise the character. Three of the remaining nine stripes are wide, giving the term 3 of 9. The arrangement of the three wide stripes and the six narrow stripes corresponds to a character set specified by the Code 39 format.

A bar code reader is a photoelectric device that is used to "read" bar codes. Reading a bar code is the process of analyzing the areas of high and low reflectivity to decipher the information encoded in the bar code. The bar code reader typically comprises an illuminator, an imaging device, and a processor. The illuminator serves to illuminate the bar code via an illumination beam of light. The illuminator may, for example, be a laser or an array of light-emitting diodes. An image beam of light constituting an image of the bar code reflects from the bar code. The imaging device receives the image beam and converts the image of the bar code to image data. The processor analyzes the image data to distinguish the areas of high reflectivity from the areas of low reflectivity. In the case of the Code 39 format, the processor distinguishes image data representing the reflective spaces from image data representing the nonreflective bars. The processor further analyzes the image data to determine the widths of the bars and spaces. Based on the analysis of the image data, the processor is able to decipher the information encoded in the bar code. Conventional bar code readers compare the widths of the stripes throughout the bar code, thus, the ratio of wide to narrow stripes must remain constant throughout the bar code.

The imaging device generates image data representing all objects intersected by the image beam. If the image beam happens to intersect an object other than a bar code, the imaging device will convert an image of the object to image data and the bar code reader will attempt to decipher the image data per a bar code format. The bar code reader will then output erroneous data to the user. A second problem occurs if the imaging device generates an erroneous image of the bar code, e.g., generating image data indicating too many stripes in the bar code. This results in the image data being in an incorrect format. When the bar code reader attempts to deciphers the erroneous image data, the bar code reader will yield an incorrect decoding of the bar code information. A third, and related, problem occurs if the widths of the stripes represented by the image data vary throughout the bar code. This may result from the speed at which the bar code was scanned varying during the scan, the bar code being moved during the scan, printing tolerances in the bar code, and other factors. The bar code reader may not be able to distinguish the wide stripes from the narrow stripes and, thus, may not be able to decipher the information encoded in the bar code.

Therefore, a need exists for a method to assure that image data received from an imaging device represents a proper bar code format regardless of deviations in the widths of the stripes comprising the bar code.

SUMMARY OF THE INVENTION

A method of reading bar codes is disclosed herein. Specifically, the method determines if image data representing a bar code conforms to a particular bar code format, e.g., the Code 39 format. The method analysis image data representing the bar code to determine if the bar code conforms to specifications defined by the bar code format. For example, the method may determine whether specified quiet zones border the ends of the bar code. The method may also determine if the bar code has a specified start character and a specified stop character.

The method may also determine if the stripes comprising a bar code meet the specifications defined by the bar code format. The method sorts the stripes into groups wherein each group represents a character encoded in the bar code. The method then determines if the correct number of wide and narrow bars and spaces are present for each character. The method also determines if the stripes in each group conform to predetermined width specifications. The above-described determinations are performed on each group individually. Accordingly, the bar code reader is able to decipher the bar code even if there are variations in the ratio of the widths of the wide to the narrow stripes from one character to another as represented by the image data.

DETAILED DESCRIPTION OF THE INVENTION

Figure 1A:
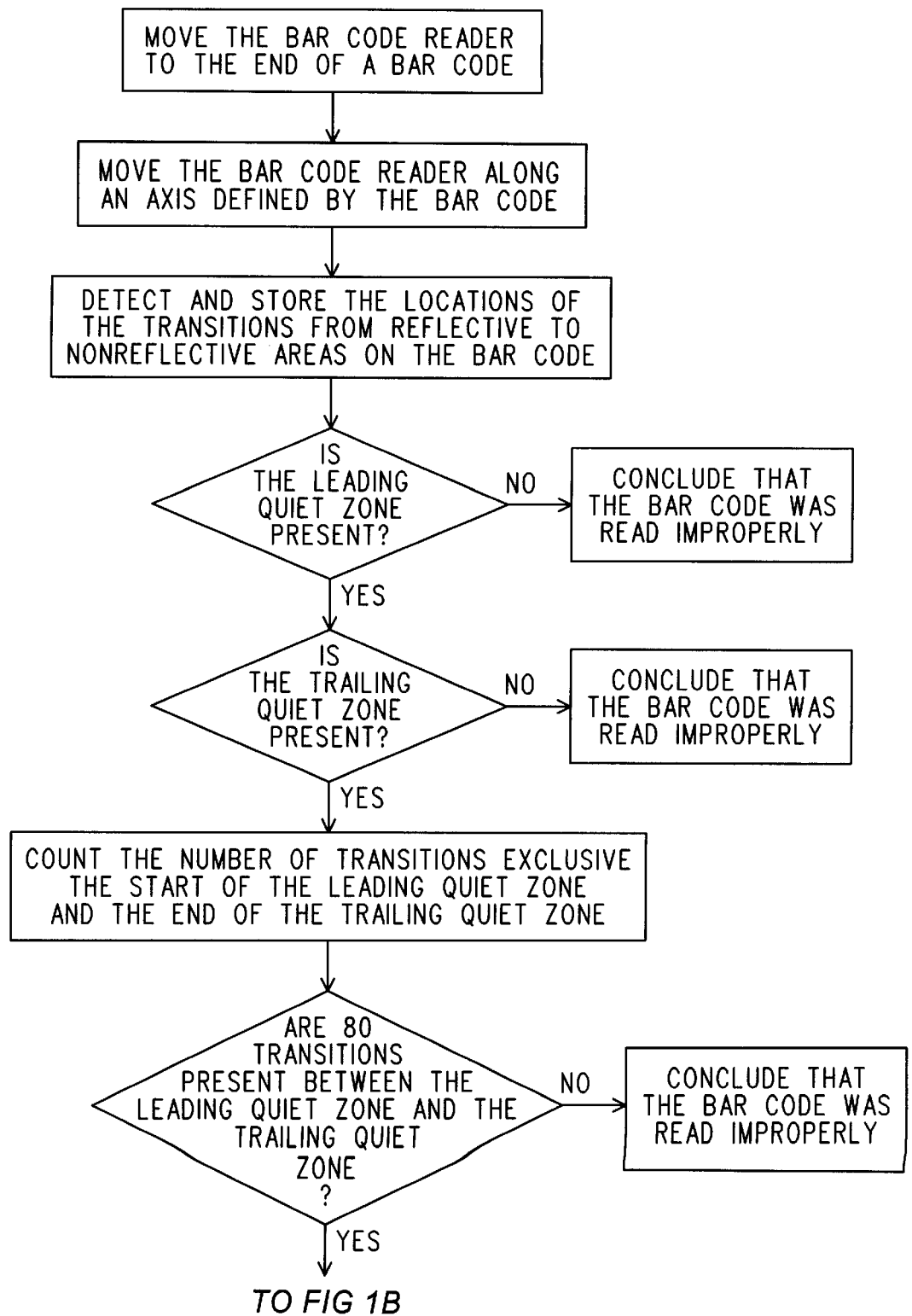
FIGS. 1A, 1B, 1C and 1D are flow charts describing a method of reading bar codes.
Figure 1B:
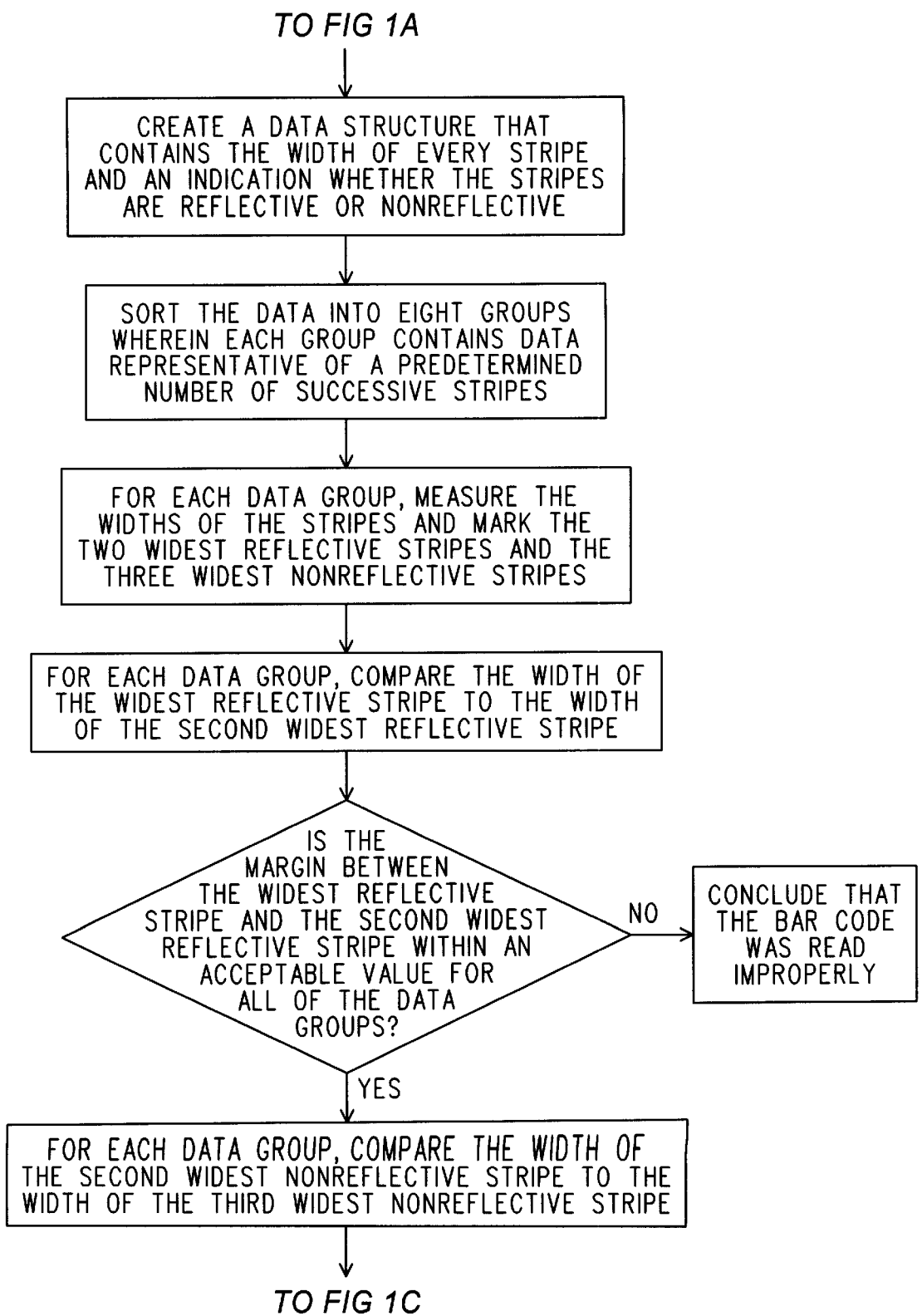
Figure 1C:
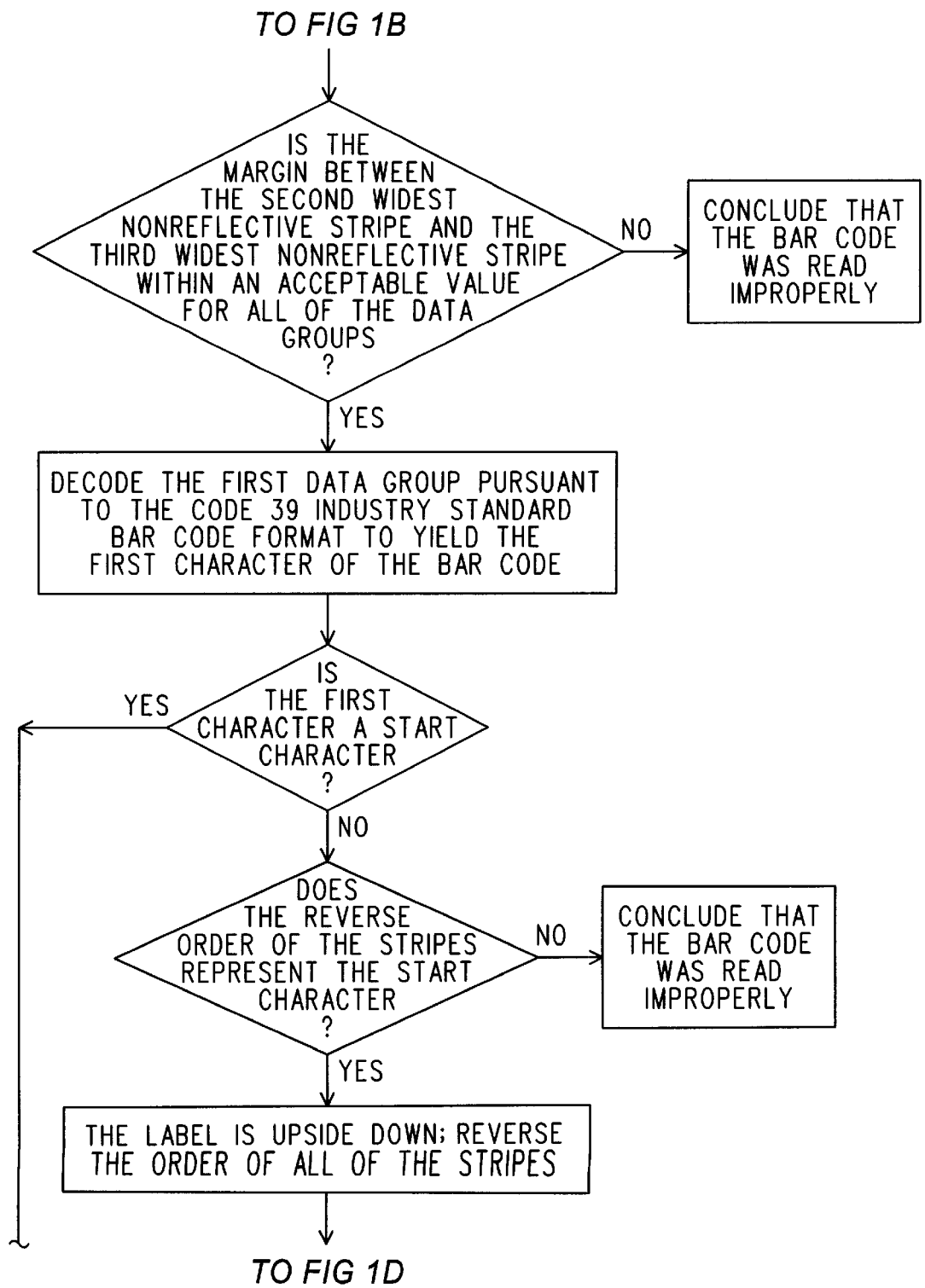
Figure 1D:
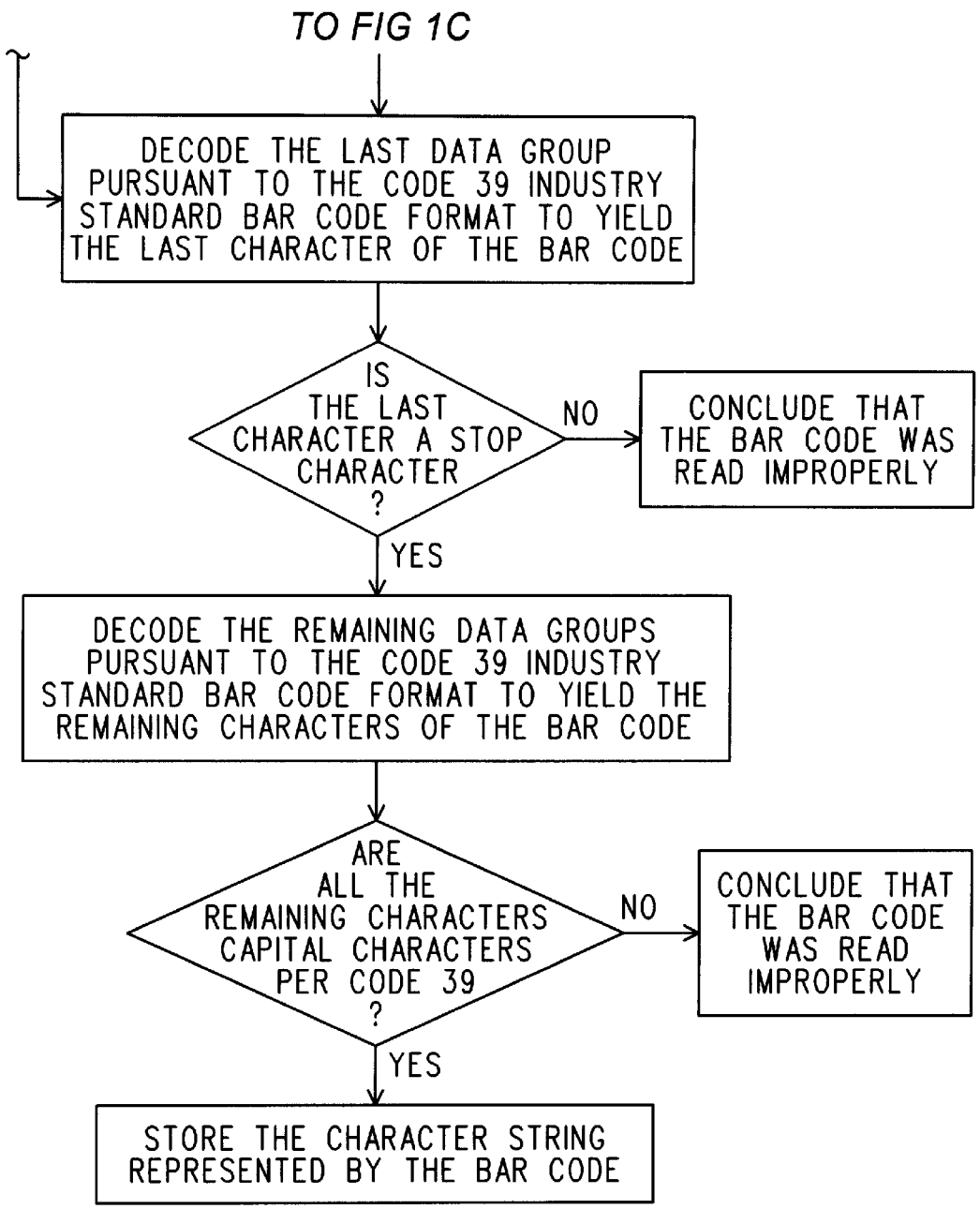

FIG. 1 is a flow chart that illustrates the method to determine whether image data received from an imaging device used in a bar code reader corresponds to the Code 39 bar code format. Specifically, the method determines if the image data corresponds to six capital alphanumeric characters per the Code 39 format. It is to be understood, however, that the following method described herein may be applicable to other bar code formats, including variations to the Code 39 format.

Code 39 is an industry standard for a specific bar code format. A bar code per the Code 39 format consists of an array of abutting stripes. The stripes alternate between nonreflective stripes, sometimes referred to herein as bars, and reflective stripes, sometimes referred to herein as spaces. A reflective stripe is a stripe that reflects more light than a nonreflective stripe. The difference in reflectivity must be great enough so that the bar code reader may distinguish the reflective stripes from the nonreflective stripes. The stripes are either wide or narrow. Code 39 defines a character set that is based on the arrangement of the wide and narrow stripes. Each character consists of a group of nine stripes in which each character has an additional leading space, which is typically narrow. The leading space serves to separate the characters and is sometimes referred to herein as an interchange gap. Three of the nine stripes comprising each character are wide and, accordingly, the remaining six stripes are narrow.

The Code 39 format specifies other indicia to assist the bar code reader to decipher the bar code. The bar code may have leading and trailing quiet zones. The quiet zones are reflective areas, similar to very wide spaces, that are located on both ends of the array of stripes comprising the bar code. The bar code information located between the quiet zones may commence and terminate with a start character and a stop character respectively. An asterisk is typically used as both the start character and the stop character. Thus, a Code 39 bar code may have a leading quiet zone followed by a series of stripes representing an asterisk. The characters, each represented by a series of nine stripes, may follow the asterisk and the characters may be separated by interchange gaps. The last character may be followed by a series of stripes representing another asterisk, which may be followed by the trailing quiet zone.

The capital alphanumeric characters defined by the Code 39 format each have two wide bars and one wide space. Accordingly, the remaining stripes consist of three narrow spaces and three narrow bars. The Code 39 format specifies the dimensions of the stripes and the ratios between wide stripes and narrow stripes. It is to be understood, however, that the method described herein is not bound by these specifications and they are only used as references. A narrow stripe may have a minimum width of 0.0075 inches. The ratio of wide to narrow stripes may range between 2.0 and 3.0, but should exceed 2.2 if the narrowest stripe is greater than 0.02 inches. The interchange gap may have a minimum width equal to the narrowest stripe. The interchange gap may have a maximum width equal to 5.3 times the width of the narrowest stripe when the narrowest stripe is less than 0.01 inches. The maximum width of the interchange gap may be three times the width of the narrowest stripe or 0.053 inches (whichever is greater) when the narrowest stripe is equal to or greater than 0.01 inches. The minimum width of the quiet zones may be 10 times the width of the narrow stripes. The method described herein may read a bar code per the Code 39 format, but with greater tolerances that those described above. For example, the ratio of the widths of the wide stripes to the narrow stripes may be reduced to 1.5, the interchange gap may be simply an imageable space, and the stripes may be virtually any width so long as they are imageable.

Having described the Code 39 format, a method of reading bar codes will now be described. The image data described herein represents a bar code pursuant to the Code 39 format. The bar code has six data characters, an asterisk used as a start character, and an asterisk used as a stop character. This description focuses on the image data representing the bar code. The image data may have been received through various bar code imaging techniques as are known in the art, which yield the widths of the stripes and whether the stripes are bars or spaces. An example of such an imaging technique is described further below as used by an autochanger.

The bar code reader may commence analyzing the image data by determining if the leading quiet zone is present. If the leading quiet zone is present, the bar code reader may measure the width of the leading quiet zone to determine if it is within a predetermined specification, e.g., 2.25 millimeters. If the leading quiet zone is not present, or if it is too narrow, the bar code reader will conclude that the bar code was not read properly. The bar code reader may then determine if the trailing quiet zone is present in the image data. If a trailing quiet zone is present, the bar code reader may measure the width of the trailing quiet zone to determine if it is within a predetermined specification, e.g., at least 2.25 millimeters. If the trailing quiet zone is not present, or if it is too narrow, the bar code reader will conclude that the bar code was not read properly.

The bar code reader may then count the number of stripes between the leading quiet zone and the trailing quiet zone. In the example described herein, there are six data characters, a start character, and a stop character. Each Code 39 character has 10 stripes including the interchange gap which is typically a narrow space constituting the first stripe of each character. The interchange gap of the start character is part of the leading quiet zone. Accordingly, the bar code has 79 stripes between the leading quiet zone and the trailing quiet zone. If 79 stripes are not present between the leading quiet zone and the trailing quiet zone, the bar code reader will conclude that the bar code was not read properly.

The image data may be separated into the individual characters represented by stripes comprising the bar code. Specifically, the image data corresponding to all the characters other than the start character may be separated into seven groups of ten stripes. Because the interchange gap of the start character is part of the leading quiet zone, the start character may have a group of nine stripes. Each group corresponds to a single character encoded in the bar code per the Code 39 format. The characters described herein are limited to capital alphanumeric characters. Pursuant to the Code 39 format, each character must have one wide space, four narrow spaces (including the interchange gap), two wide bars, and three narrow bars.

For each character group, the bar code reader may measure and record the width of the widest space, excluding the interchange gap. The remaining spaces, excluding the interchange gap, are marked as narrow spaces. The bar code reader may then measure and record the width of the second widest space, excluding the interchange gap, which is the width of the widest narrow space. The processor may then divide the width of the widest space by the width of the second widest space. This ratio is the ratio of the wide space to the widest narrow space. The ratios are measured for each of the eight characters comprising the bar code. The ratios are then compared to a predetermined ratio, e.g., 1.5. If any of the ratios are not greater than the predetermined ratio, the bar code reader will conclude that the bar code has not been read properly.

For each character group, the bar code reader may measure and record the width of the second widest bar. The width of the second widest bar is marked as a wide bar reference and is the width of the narrowest wide bar. The remaining bars that are narrower than the wide bar reference are marked as narrow bars. The bar code reader may then measure the width of the third widest bar, which is the width of the widest narrow bar. The bar code reader may then calculate the ratio of the wide bar reference to the width of the widest narrow bar. The bar code reader may then repeat this process for the remaining seven character groups. The bar code reader may then compare these ratios to a predetermined ratio, e.g., 1.5. If any of the calculated ratios not greater than the predetermined ratio, the bar code reader will conclude that the bar code was not read properly.

The bar code reader may now determine the correct order to decipher the image data. This is necessary because the bar code may have been imaged commencing at the leading quiet zone or the trailing quiet zone. If the bar code was imaged commencing with the trailing quiet zone, the image data will be deciphered in the incorrect order, yielding an improper decoding of the bar code information. Determining the proper order of the image data may be accomplished by decoding the first character group, which should be the start character. In the Code 39 format, the asterisk is typically used as the start character and is represented by the following stripes: narrow bar, wide space, narrow bar, narrow space, wide bar, narrow space, wide bar, narrow space, narrow bar. If the first character group does not correspond to an asterisk, the bar code reader may reverse the order of the stripes comprising the first character group to determine if the reverse order of the stripes corresponds to an asterisk. It the reverse order of stripes comprising the first character group corresponds to an asterisk, the bar code will conclude that the bar code was imaged backwards and the bar code reader may reverse the order of all the stripes for all future analysis of the bar code. If, on the other hand, the reverse order of the stripes comprising the first character group does not correspond to an asterisk, the bar code reader will conclude that the bar code was not read properly. This conclusion is based on the inability of the bar code reader to decipher an asterisk from either the forward or backward reading of the stripes comprising the first character group.

The bar code reader may then decipher the last character group to determine if the image data corresponds to the stop character. In this example, the asterisk is used as both the start character and the stop character. If the last character group does not correspond to an asterisk, the bar code reader will conclude that the bar code was not read properly.

At this point, the bar code reader has determined that the leading and trailing quiet zones are present, all the stripes are either wide or narrow, and the start character and the stop character are both present. Additionally, the bar code reader has determined the proper order for deciphering the image data contained in the character groups. The bar code reader may now decipher the six remaining character groups, sometimes referred to herein as the data characters. In this example, the data characters are only capital alphanumeric characters. If the bar code reader deciphers any character other than a capital alphanumeric character, the bar code reader will conclude that the bar code was not read properly.

Deciphering the data characters may consist of comparing the order of the wide and narrow bars and spaces to a data file corresponding to characters per the Code 39 format. The bar code reader has previously determined which stripes are wide and which stripes are narrow. Thus, the bar code reader only needs to compare the arrangement of stripes to the data file. When the data characters have been compared to the data file, the bar code reader may output these capital alphanumeric characters in a conventional manner. If, however, any character group does not correspond to a character in the data file, the bar code reader will conclude that the bar code was not properly read.

The method of reading bar codes has been described above used on a bar code with four capital alphanumeric characters bounded by asterisks. It is to be understood, however, that the method described above may be applicable to other bar code formats. For example, the bar code may have any number of capital alphanumeric characters and does not need to be bounded by asterisks.

The method of reading bar codes as described herein will read an imperfect bar code or a bar code that may be represented by flawed image data. The method described herein deciphers each character group of stripes individually. This allows for the image data to have some tolerance in the ratio of the widths of the wide stripes to the widths of the narrow stripes between the character groups comprising the bar code. In the event the bar code was printed with tolerances or if the image data has become corrupt, the method described herein may still decipher the bar code.

Figure 2:
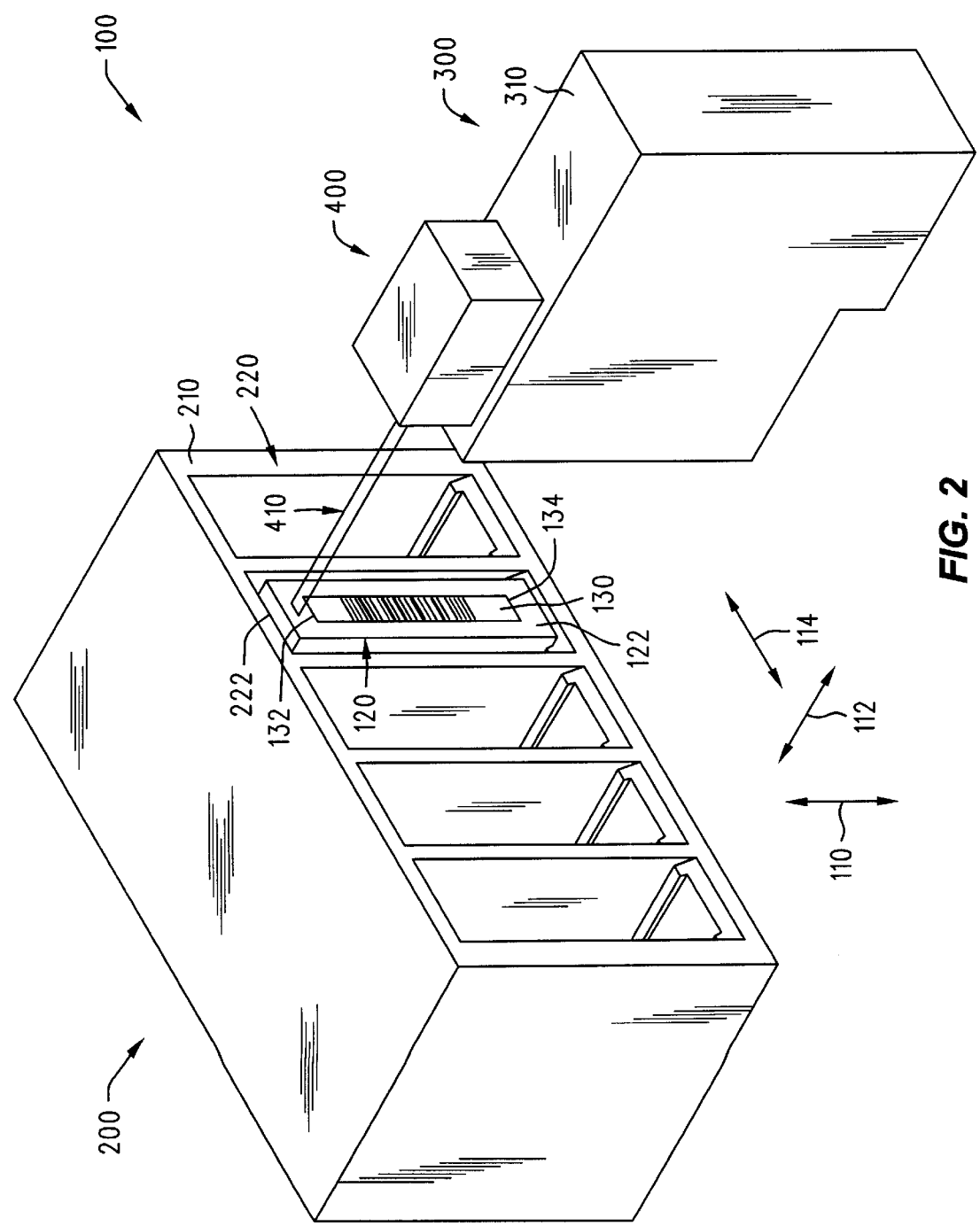
FIG. 2 is a side perspective view of an autochanger that incorporates a bar code reader.

Having described a method of deciphering image data representing a bar code, a method of generating image data from a bar code will now be described. Image data may be generated through numerous methods. One method of generating image data is illustrated by an autochanger 100 in FIG. 2. The autochanger 100 is a device that stores media pieces, of which the digital linear tape cartridge 120 is an example, in a magazine 200. When the information stored on a specific media piece is required by a user, the autochanger 100 uses a picker 300 to move the media piece from the magazine 200 to a media player, not shown. Likewise, when the user no longer requires the information stored on the specific media piece, the autochanger 100 uses the picker 200 to move the media piece from the media player to the magazine 200.

Having summarized the autochanger 100, it will now be described in detail. Only the components necessary to illustrate the autochanger 100 reading a bar code 130 are illustrated in FIG. 1. Specifically, the autochanger 100 may have a magazine 200, a picker 300, and a bar code reader 400. The magazine 200 may be a generally parallelepiped structure having a front surface 210. The front surface 210 may have a series of slots 220 that are adapted to hold digital linear tape cartridges. A slot 222 is illustrated holding the digital linear tape cartridge 120. The digital linear tape cartridge 120 may have a front side 122. A bar code 130 may be affixed to the front side 122 of the digital linear tape cartridge 120. The bar code 130 may have a top side 132 and a bottom side 134. Information may be encoded on the bar code 130 from the top side 132 toward the bottom side 134. Accordingly, the leading quiet zone may be in the vicinity of the top side 132 and the trailing quiet zone may be in the vicinity of the bottom side 134. The bar code 130 may conform to the Code 39 format as described above.

The picker 300 may be a generally parallelepiped structure that may serve to transport digital linear tape cartridges within the autochanger 100. The picker 200 may be operatively attached to a servo system, not shown, in a conventional manner. The servo system may serve to move the picker 200 in a vertical direction I 0, a plunge direction 112, and a transverse direction 114. An orientation system, not shown, may also be operationally attached to the picker 300 in a conventional manner. The orientation system may provide information pertaining to the location of the picker 300, which may be readily used to determine the incremental movement of the picker 300.

The picker 300 may have a top side 310. The bar code reader 400 may be affixed to the top side 310 in a conventional manner. The bar code reader 400 may, as an example, be a fixed beam bar code reader as is known in the art. The bar code reader 400 may receive light from an image beam 410. The image beam 410 may be located in a fixed position relative to the bar code reader 400. An example of a commercially available bar code reader is available from the Welch Allyn Company of Skaneateles Falls, N.Y., and is referred to as Model 6500.

Having described the autochanger 100, it will now be described using the combination of the picker 300 and the bar code reader 400 to read the bar code 130. The bar code 130 is positioned within the autochanger 100 so that the information encoded on the bar code 130 is read on an axis extending in the vertical direction 110 from the top side 132 toward the bottom side 134. The servo system, not illustrated, moves the picker 100 in the vertical direction 110, the plunge direction 112, and the transverse direction 1 14 to a position wherein the image beam 410 intersects the top side 132 of the bar code 130. The picker 300 then moves in the vertical direction 110 so that the image beam 410 scans from the top side 132 to the bottom side 134 of the bar code 130. As the image beam 410 scans the bar code 130, the orientation system, not illustrated, outputs data corresponding to the vertical position 110 of the picker 300. The bar code reader 400 receives the information from the orientation system and uses the orientation information to determine the widths of the stripes comprising the bar code 130. When the bar code reader 400 has generated image data representing the bar code 130, the bar code reader 400 then deciphers the bar code per the above-described method.

An embodiment of the bar code reader 400 uses a charge-coupled device to generate the image data. A charge-coupled device may have an image beam that is appropriately sized to generate an image of the entire bar code 130 without the need to move the picker 300 in the vertical direction 110. Another embodiment of the bar code reader 400 uses a scanning image beam. The image beam scans in the vertical direction 110 over a distance that is appropriately sized to include the entire bar code 130. Accordingly, the picker 300 does not have to move the bar code reader 400 in the vertical direction 110 to generate an image of the bar code 130. Both of the above-described embodiments may use the method of reading a bar code as described herein.

It is contemplated that the inventive concepts herein described may be variously otherwise embodied and it is intended that the appended claims be constructed to include alternative embodiments of the invention except insofar as limited by the prior art.

What is claimed is:

1. A method of reading bar codes comprising:
   receiving data representing an image of said bar code which is to be read;
   performing a first analysis on said data wherein said first analysis determines if said bar code is bounded by areas of reflectivity;
   performing a second analysis on said data wherein said second analysis counts the number of stripes on said bar code between said areas of reflectivity;
   performing a third analysis on said data wherein said third analysis compares the width of the widest reflective stripe on said bar code to the width of the second widest reflective stripe on said bar code;
   performing a forth analysis on said data wherein said forth analysis compares the width of the second widest nonreflective stripe on said bar code to the width of the third widest nonreflective stripe on said bar code;
   performing a fifth analysis on said data wherein said fifth analysis deciphers said data.

2. The method of claim 1 wherein said performing a second analysis comprises determining if nine stripes are present on said bar code between said areas of reflectivity.

3. The method of claim 1 wherein said bar code is affixed to a media piece.

4. A method of reading bar codes comprising:
   receiving data representing an image of said bar code, wherein said data comprises a series of data segments, and wherein each data segment represents a stripe on said bar code;
   performing a first analysis on said data wherein said first analysis determines if said bar code is bounded by areas of reflectivity;
   performing a second analysis on said data wherein said second analysis counts the number of said data segments;
   grouping said data segments into groups of successive data segments wherein each group has a predetermined number of data segments;
   performing a third analysis on a first group of said groups of successive data segments wherein said third analysis compares the width of the widest reflective stripe represented by a data segment in said first group of said groups of successive data segments to the width of the second widest reflective stripe represented by a data segment in said first group of data segments;
   performing a forth analysis on said first group of said groups of successive data segments wherein said forth analysis compares the width of the second widest nonreflective stripe represented by a data segment in said first group of data segments to the width of the third widest nonreflective stripe represented by a data segment in said first group of data segments.

5. The method of claim 4 further comprising repeating said performing a third analysis for all of said groups of data segments.

6. The method of claim 4 further comprising repeating said performing a forth analysis for all of said groups of data segments.

7. The method of claim 4 further comprising performing a fifth analysis on said data wherein said fifth analysis deciphers each of said groups of data segments.

8. The method of claim 4 further comprising performing a sixth analysis on said data comprising deciphering said first group of data segments to yield a start character and comparing said start character to a predetermined character.

9. The method of claim 8 further comprising reversing the order of said data segments based on the result of said analysis.

10. The method of claim 4 further comprising performing a seventh analysis on said data comprising deciphering the last group of data segments to yield a stop character and comparing said stop character to a predetermined character.

* * * * *